United States Patent

[11] 3,590,279

[72] Inventors Bobby J. Thompson
San Jose;
Eugene T. Perusse, W. Corina both of, Calif.
[21] Appl. No. 13,546
[22] Filed Feb. 24, 1970
[45] Patented June 29, 1971
[73] Assignee LTV Ling Altec, Inc.
Anaheim, Calif.
Continuation-in-part of application Ser. No. 639,744, May 19, 1967, now abandoned.

[54] VARIABLE PULSE-WIDTH PULSE-MODULATOR
16 Claims, 6 Drawing Figs.
[52] U.S. Cl. ................................................ 307/265,
307/246, 307/252 K, 328/67
[51] Int. Cl. ...................................................... H03k 1/18
[50] Field of Search .......................................... 307/246,
265, 268, 252 K, 305; 328/58, 67; 332/9, 12

[56] References Cited
UNITED STATES PATENTS
3,168,701 2/1965 Foitzik et al. .................. 328/67

Primary Examiner—Donald D. Forrer
Assistant Examiner—John Zazworsky
Attorney—Harry R. Lubcke ABSTRACT: A solid-state pulse-modulator for producing power output pulses from a source of direct current, the width (duration) of which can be varied on a pulse-to-pulse basis within a given range. This modulator does not employ mechanical switches, such as are normally required for variable pulse-width, high-voltage pulse-modulators. More specifically, a group of parallel-connectable resonant-chargeable networks is provided, each including a capacitor and an inductor. A predetermined number of the chargeable networks are charged by gating into conduction one or more silicon-controlled rectifiers located in the charging path. Still another silicon-controlled rectifier is gated into conduction to discharge all of the charged chargeable networks, to produce an output pulse having a pulse-width proportional to the number of chargeable networks that are so charged and discharged.

INVENTORS
BOBBY J. THOMPSON
EUGENE T. PERUSSE
BY Harry R. Lubcke
AGENT

INVENTORS
BOBBY J. THOMPSON
EUGENE T. PERUSSE
BY
Harry R. Lubcke
AGENT

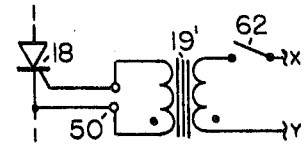
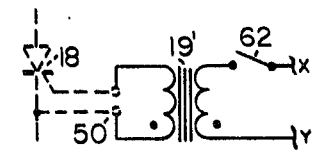

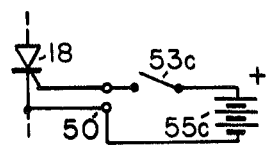
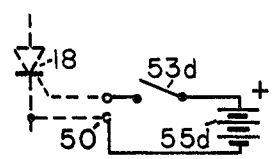
INVENTORS
BOBBY J. THOMPSON
EUGENE T. PERUSSE
BY Harry R. Lubcke
AGENT

VARIABLE PULSE-WIDTH PULSE-MODULATOR

This application is a continuation-in-part of our application, Ser. No. 639,744, filed May 19, 1967, for "Variable-Width Pulse Modulator," which is now abandoned.

BACKGROUND OF THE INVENTION

This invention relates to an electrical pulse-modulator, and in particular to modulators for producing variable-width output pulses.

Reliable lightweight modulators capable of producing variable-width output pulses having a well defined pulse shape find extensive application in airborne radar units. Prior to this invention, extensive use was made of saturable reactors in pulse switching circuits and of mechanical relays in programming pulse widths. The saturable reactor operated satisfactorily and is capable of producing well defined pulses; however, where weight is a critical factor, such as in airplane and missile applications, the weight of a plurality of saturable reactors and high voltage relays is an undesirable factor. In addition, the short operational life of a mechanical device operating at high voltage adversely affects the reliability of operation of the modulator, and consequently the reliability of the radar with which it is employed. Since airborne radar units are used quite extensively to insure safe operation of both military and commercial aircraft, the unreliability associated with the high-voltage mechanical relay is not desirable.

SUMMARY OF THE INVENTION

In the variable pulse-width pulse-modulator of this invention, both the saturable reactor with its weight penalty and the high-voltage mechanical relay, with its unreliability factor, are replaced with inexpensive, lightweight and reliable semiconductor devices. A triggerable electrically conductive device, such as a silicon-controlled rectifier (SCR), is used as a switch to connect a source of direct current to a predetermined number of paralleled capacitors. A diode connected between adjacent capacitors acts to isolate one or more of these capacitors from the remainder of the group. A saturable reactor is also replaced by a solid state switching device (SCR, for example) for connecting the pulse-forming network to the load for forming the output pulse.

It is the object of this invention to provide a reliable, lightweight, low-cost, compact, solid-state variable pulse-width pulse-modulator having well defined output pulses.

DESCRIPTION OF THE PREFERRED EMBODIMENTS

Figure 1:
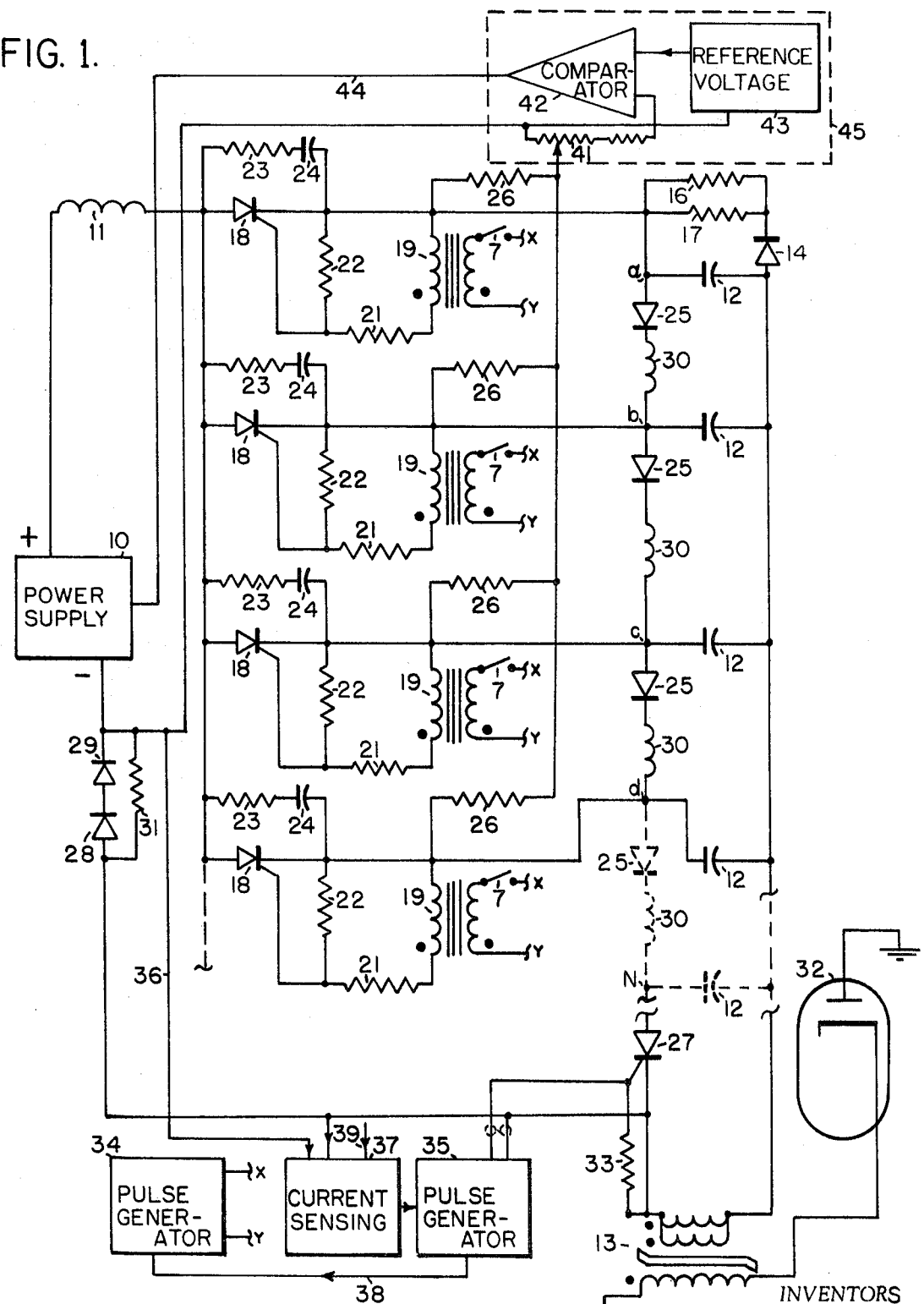
FIG. 1 is a schematic diagram of one embodiment of the variable pulse-width pulse-modulator according to this invention.

FIG. 1 shows an embodiment of the invention having N sections of pulse-forming network and N chargeable means, as capacitors 12, for producing N different widths of output pulses. The respective sections of the pulse-forming network are identified as "a, b, c, d—N" at the noncommon terminals of the several capacitors 12. These subscripts are employed herein, when required, to designate specific such elements, as $12_a$, $18_c$, etc.

An AC to DC rectifier power supply 10 provides direct current power for operating the modulator. It is connected to inductor 11 and therethrough to a plurality of first means, silicon controlled rectifiers 18, which in turn connect to a plurality of parallel-connectable chargeable means, essentially capacitors 12. Each capacitor 12 has a first (common) terminal connected to a first terminal of the primary winding of output transformer 13, or directly to an electrical load depending upon the impedances involved. This common connection also connects to the anode of clipper diode 14. A clipper network also includes paralleled resistors 16 and 17, which are connected from the cathode of diode 14 to the second terminal of capacitor $12_a$. SCRs 18 having anodes, cathodes and gates, each anode is connected to inductor 11 and each cathode to a corresponding capacitor 12, thereby allowing current of positive voltage polarity to flow when the gates are appropriately triggered.

Pulse transformers 19 are provided to trigger the gates. The secondary of each is connected to a voltage divider comprised of resistors 21 and 22. Each SCR gate is connected to the junction of the resistors and each SCR cathode is connected to the terminal of the secondary that is also connected to resistor 22. The primary and secondary of each transformer 19 are related as to direction of winding and thus as to polarity of output pulse as shown by the conventional dots at the ends of each winding; these signifying corresponding ends. It will be noted that a positive pulse input to each primary will produce a positive pulse output at each secondary for the gate of the corresponding SCR, as required.

An SCR 18 is turned ON by a triggering signal generated by charge-signal generator 34. Suitable connections therefrom to the primaries of respective transformers 19 are designated by the letters "x" and "y". So that selected capacitors 12 alone may be charged, single pole switches 7 are shown in each primary circuit. These may be manual switches that are operated independently by the operator, but more usually these are made a part of other controls required for the whole radar apparatus and set the pulse-width in accordance with other aspects desired in the operation of the radar or equivalent load device.

To prevent false triggering of an SCR 18 by an excessive rate of rise of forward applied voltage resistor 23 and capacitor 24 are connected in shunt across each SCR from anode to cathode. Elements 23 and 24 reduce the rate of rise of all applied voltages to the SCRs.

The cathode of each SCR 18 is further connected to an individual resistor 26, which in turn connects to potentiometer 41. By a servo loop returned back to power supply 10 this circuit provides for adjustment of the voltage of the output pulses by adjustment of potentiometer 41, and for maintaining the amplitude of the output pulses uniform at any given adjustment. This loop circuit is explained later. It will be noted that the potential of the cathode of an SCR is the same as that of a corresponding capacitor 12 to which it is connected. The amplitude of the output pulses is maintained constant regardless of the number of pulse-forming network sections turned on by the SCR 18 involved, as selected.

Completing the structure of the pulse-forming network, the anode of disconnect diode 25 is connected to the second terminal of capacitor $12_a$. The cathode thereof is connected through inductor 30 to the second terminal of the adjacent capacitor $12_b$. Similarly, a second diode-inductor combination is connected between terminals $b$ and $c$, a third diode between terminals $c$ and $d$, with its inductor, and so on. Each inductor 30 has a specific and rather small inductance of a value determined by the impedance of the pulse-forming network. The structure is a transmission line having N sets of lumped constants, each set consisting of the charging circuit associated with a respective capacitor 12. The impedance thereof is matched to the termination of the transmission line, including transformer 13 or its equivalent.

The main switch for discharging the charged pulse-network capacitors 12 through the load, including output transformer 13, is SCR 27, with anode connected to the second terminal of capacitor $12_n$ and cathode connected to the primary winding of output transformer 13. Transformer 13 may be of the known square-loop core type of pulse transformer, but it is not operated to saturation. Where a large step-up ratio is desired the primary may have two or more windings wound in the same direction and connected in parallel. While a step-up transformer is desirable for radar, where high modulating pulse voltage is required, transformer 13 may be omitted if the load is of another type and of lower impedance.

Typically, a second pulse generator 35 supplies the required triggering voltage, properly timed, for main switch SCR 27. It is necessary that each charging pulse from pulse generator 34 be delayed sufficiently to allow SCR 27 to recover from its last discharge. Second pulse generator 35 may be a self-generating pulse oscillator, say of the relaxation type, but a timing pulse generated from a device employed in the functioning of the radar or other apparatus as a whole, produced by perhaps a digital clock, is usually available. It is either necessary or desirable that such a pulse be employed. Thus, an input at 39 enters current sensing entity 37. This is an inhibitor as regards pulses entering at 39.

Such a circuit is required to prevent SCR 27 from being turned ON while the pulse-forming network is being charged through SCR 18, as selected. Should this occur, a short circuit through the primary winding of transformer 13 would result and the circuit would be damaged. Accordingly, two diodes in series, 28 and 29, are inserted in the negative lead to power supply 10 and are shunted by resistor 31. Being poled with cathodes toward the negative power supply terminal, these diodes pass current in normal operation. As long as current continues to flow, the diode drop in them will provide a voltage sufficiently large enough to overcome the one diode drop in the input transistor in current sensing entity 37 and so operate the same.

A circuit that may be used for entity 37 may consist of two transistors, with collectors connected in parallel to a common load resistor, with grounded emitters and separate bases. When current flow sensed by diodes 27 and 28 is applied to the first base the first transistor is turned ON. Because of the common load resistor pulses from input 39, applied to the second base, will not be reproduced at the common load resistor, thus will not be present at the output of entity 37 and will not be passed on to actuate pulse generator 35. In the absence of the voltage drop from diodes 27 and 28, the first transistor will not be ON and so the pulses will be passed. This current-sensing arrangement is similar to that disclosed in U.S. Pat. No. 3,207,994, issued Sept. 21, 1965 to Theodore and Perusse, Class 328, in which further information will be found.

In order to obtain the pulse delay required after SCR 27 has conducted and before charging starts through an SCR 18, pulse generator 34 may consist of a pair of one-shot (monostable) relaxation oscillators. A delay of the order of 100 microseconds is required. The first monostable oscillator may be triggered by differentiating an edge of the pulse which is received from generator 35 via synchronizing conductor 38. The pulse therefrom triggers the second monostable oscillator, and this pulse, of the order of a microsecond duration and delayed the desired interval, leaves generator 34 at terminals "$x$" and "$y$."

In FIG. 1 the load is shown in the form of a magnetron 32, having an anode which is grounded and from which radio frequency energy is taken from a cavity structure surrounding it, and also having a cathode, which is connected to the secondary of transformer 13 and receives the high voltage power pulse from the modulator of this invention. The cathode may have a heater electrode, which is energized by other electrical energy, but since these means are not important herein they have not been shown.

Considering now the operation of the modulator, capacitors 12 will have been discharged by the operation of SCR 27 from the preceding cycle. Assume that the desired pulse width requires charging of all capacitors 12 save the one connected to terminal "$a$." The output of pulse generator 34 is programmed by closing the appropriate switch 7 of transformer $19_b$. Switches 7 may be usual electrical switches as shown, or an electronic equivalent where a control signal affects a transistor circuit for passing or inhibiting the control pulse required. The pulse at the secondary of pulse transformer $19_b$ is of sufficient amplitude to gate SCR $18_b$ into the conducting state. Thus, current flows from power supply 10, through inductor 11 to charge all of the capacitors 12 that have been selected by this circuit arrangement. This includes capacitors $12_b$, $12_c$, $12_d - 12_n$. These are charged to a voltage twice that of the power source 10 because of the resonant surge in the circuit formed of inductor 11 and capacitors 12. However, capacitor $12_a$ is not charged, since diode $25_a$, connected between terminals $a$ and $b$ is back-biased. It does not conduct because the potential at terminal $b$ is greater than that at terminal $a$. Each of the remaining diodes 25 are forward-biased and conduct, since the potential at the anode is greater in each case than the potential at the cathode. When the selected capacitors are charged SCR $18_b$ ceases conduction, since the potential at its cathode is twice as positive as at its anode.

The voltage level to which capacitors 12 are thus charged is sensed by a circuit including each of the resistors 26. These resistors have a high value, of the order of megohms, to prevent significant loss of charge during the charging cycle. These resistors connect to potentiometer 41, which in turn connects to one input of comparator amplifier 42. The other input is a source of reference voltage 43, which may be a Zener diode. The proportion of the capacitor 12 charge voltage sampled by resistors 26 and modified as desired for adjustment of the circuit performance by the position chosen for the wiper on potentiometer 41 is compared with the Zener reference voltage and the output of comparator amplifier 42 gives the result in an electrical amplitude. This output is conveyed to known output voltage control means forming a part of power supply 10 by conductor 44. For later reference this group of servo elements is identified as a whole by dotted rectangle 45.

The pulse-forming network is now ready for discharge through SCR 27 with a pulse width (duration) directly related to the number of capacitors 12 that have been charged. Timed triggering is obtained from pulse generator 35 via the two conductors which connect therefrom to the gate and cathode of SCR 27. These conductors are indicated as shielded by the dotted figure-eight. This is desirable but not mandatory.

It will be understood that when a narrow pulse is desired that SCR 18 near the bottom of the circuit diagram in FIG. 1, such as at $d$, is triggered; while for a pulse of maximum width the SCR 18 at the top, at $a$, is triggered. In the latter case, all of the capacitors 12 lower in the diagram are also charged by the current flowing through SCR $18_a$ and through the several diodes 25.

The use of diodes 25 between adjacent paralleled capacitors 12 produces very little effect upon the magnitude or shape of the output pulse. Diodes are available for use in the modulator of this invention which have a pulse voltage drop of less than 3 volts in the forward direction. Since the pulse formed at the end of the line, across the primary of transformer 13 has an amplitude of approximately 250 volts, the 3 volt voltage drop is a very small percentage of the total pulse amplitude.

Clipper diode 14 and resistors 16 and 17 provide a means of preventing oscillatory reversal of the voltage of the pulse-forming network in the event of a short-circuited or arcing load.

With the modulator described herein it is possible to produce a pulse train at output transformer 13 with each pulse having a different width, if this is desired. By programming pulse generator 34 to electronically accomplish the equivalent of closing a different switch 7 for each pulse to be formed the desired result is secured.

For example, if each pulse is to be narrower than the preceding one, the program would begin by gating the SCR 18 that is connected to terminal $a$. For the second pulse $SCR_b$ would be turned ON, for the third pulse $SCR_c$ would be turned ON, and so on, until only the Nth SCR 18 would be turned ON, so that only one capacitor 12 would be charged. In each instance the pulse for SCR 27 to effect discharge would be timely produced.

It will be understood that a program for increasing successive pulse widths, or of staggered pulse widths may also be accomplished by modifying the example given.

The modulator shown in FIG. 1 is suited for producing output pulse amplitudes of from 200 volts to 30 kilovolts, utilizing appropriate components. For high-power modulators according to this invention the circuit of FIG. 1 can be paralleled as described in U.S. Pat. No. 3,163,782, issued Dec. 29, 1964, to James A. Ross, for "Multiple Delay Line Solid State Pulse Modulator."

The characteristic of "frequency agility" pointed out above in the matter of very rapidly altering pulse width and repetition rate is desirable in preventing jamming of the resulting radar signal, if the output of the modulator be so used. The repetition rate is altered by altering the period between successive pulses impressed upon the modulator at connection 39, or the same if pulse generator 35 is self-oscillating.

Figure 2:
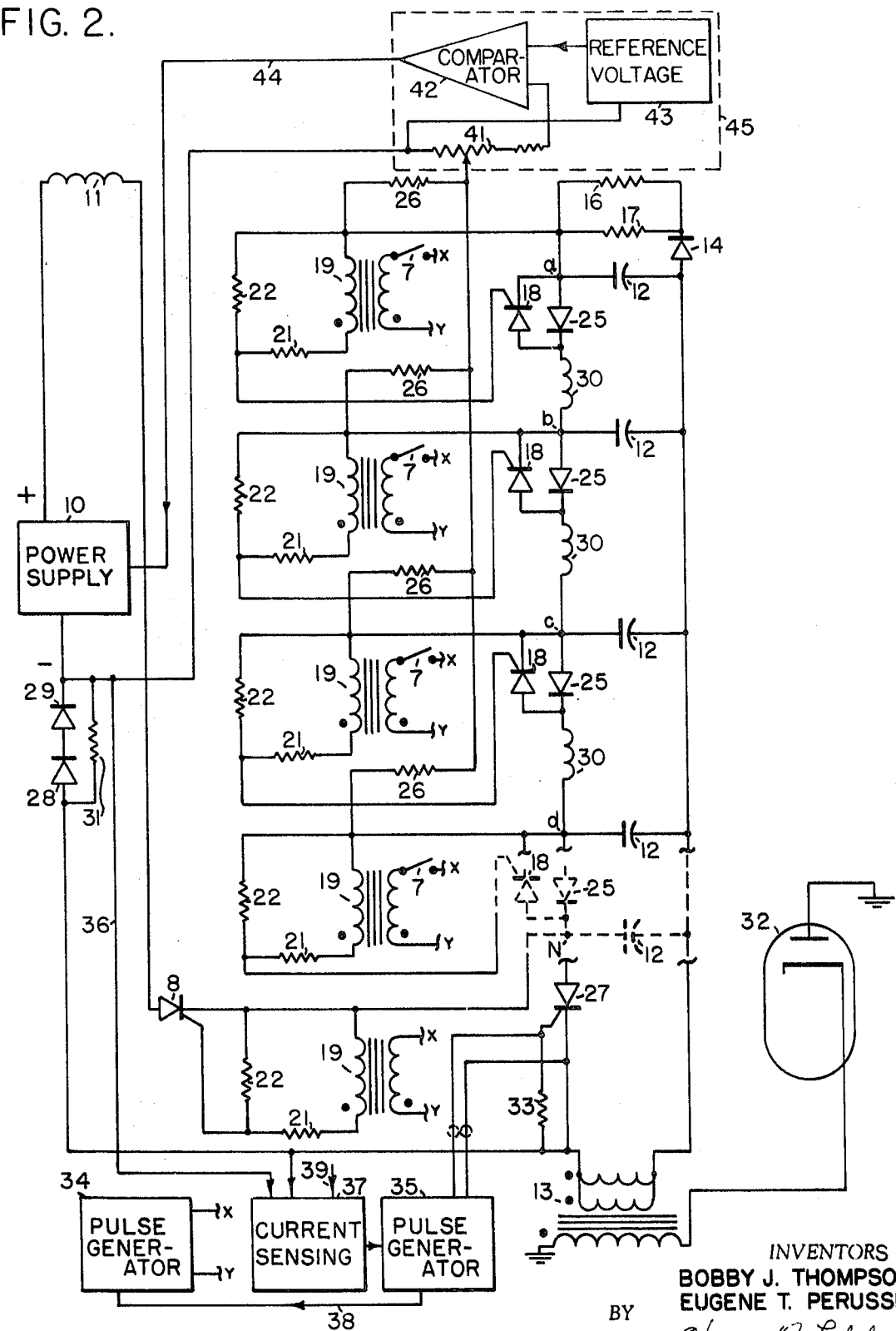
FIG. 2 is a schematic diagram of a second embodiment of the same, having a different arrangement for varying the width of the pulses.

The alternate embodiment of FIG. 2 differs from that of FIG. 1 in that the several SCRs 18 are more individually identified with the capacitor 12 with which they coact. Also, an additional SCR, 8, is employed to pass charging current from inductor 11 through selected SCRs 18 and to such capacitors 12 as are to receive a charge.

In each of the pulse-forming sections "a," "b," "c," etc. a corresponding SCR 18 is now shunted across a diode 25. The cathode of the SCR is connected to the anode of the diode, at point "a" for example, and the anode of the SCR is connected to the cathode of the diode. The gate of each SCR is connected to the midpoint between voltage-divider resistors 21, 22 as before, and therethrough to a pulse transformer 19. The cathode of each SCR is connected to the common terminal between the top of the secondary of transformer 19 and resistor 22, as before.

The primary of each transformer 19 is connected at "x" and "y" to pulse generator 34 as before, with a switch 7 interposed in each instance. The switches are operated differently than as before. Each switch 7 must be closed for the capacitor associated therewith to receive a charge. In FIG. 1, when the switch highest up on the pulse-forming network was closed all lower sections were also charged by current flowing through the several diodes 25.

For the narrowest pulse section "N" only is charged. Since the modulator as a whole would be inoperable if a switch to every section was opened, there is no need for a switching arrangement for the "N" section. When a next longer duration pulse is desired, the switch 7 associated with section "d" is closed prior to the charge operation of the modulator. When a still longer duration pulse is desired, the switch associated with section "c" is closed in addition to the switch for section "d." For still longer, the switch for section "b" is closed, and for still longer yet, the switch for section "a" is closed. This results in all of the switches 7 being closed for maximum pulse width.

Switch 7 for this embodiment may be of the fan type and be rotated by the operator or by a stepping motor to select the desired pulse width. Since the load for this modulator is frequently a radar transmitter and other parts thereof require different circuit values consonant with the duration of the emitted pulse, switch 7 may be one deck of a compound switch, with which all of the required parameters are selected by turning one shaft. Further, for programmed or automatic operation, equivalent solenoid switches, relays, or solid-state switch-mode circuits may be employed instead of manual switches 7. A control medium, such as perforated paper tape or magnetic tape, may be employed to energize the individual switches according to a digital scheme, since several are typically closed at any one time.

As in FIG. 1, main switch SCR 27 is fired by a pulse from generator 35 at a time when charging has been completed in each instance and according to a desired repetition rate for the train of pulses. The mechanism of discharge is the same as before, with the charges from the several capacitors 12 passing through corresponding diodes 25, through SCR 27, and to the load. Considering the load to be a magnetron, as before, transformer 13 is interposed, having a step-up ratio of perhaps 50 to 1. The amplitude of the output voltage pulses are controlled, as before, by the comparator-reference entity 45.

Figure 3:
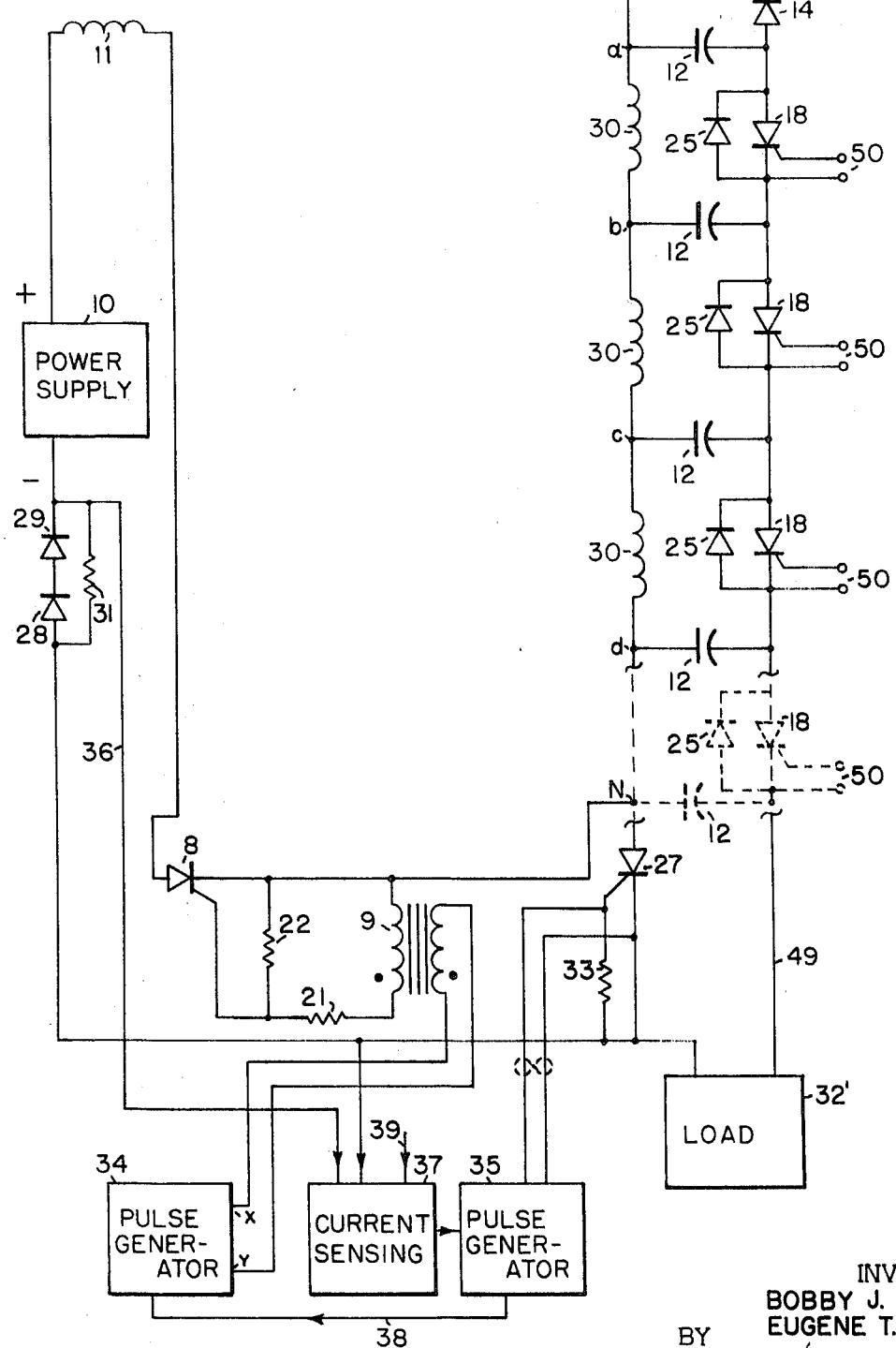
FIG. 3 is a schematic diagram of a third embodiment of the same, in which the semiconductor elements are connected differently in the pulse-forming network.

In the alternate embodiment of FIG. 3 SCRs 18 and diodes 25 have merely been moved from the left leg of each section of the pulse-forming network to the right leg 49. This does not alter the pulse-forming operation of the network, but does allow different circuit arrangements for activating each section for altering the pulse width. These arrangements are shown in subsidiary FIGS. 3A, 3B and 3C.

The several transformers 19 are not to be found in the central part of FIG. 3. These form but one alternate subarrangement for this figure; that shown in FIG. 3C. The other parts of FIG. 3 follow the circuitry of FIGS. 1 and 2, and the minor alternates that have been discussed with these figures.

Figure 3A:
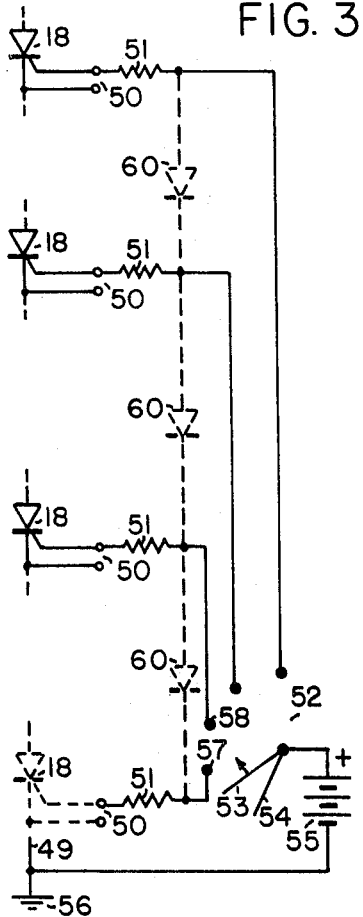
FIGS. 3A, 3B and 3C are alternate circuits supplemental to the schematic diagram of FIG. 3, as to actuating means for charging selected pulse-forming capacitors.

In conjunction with FIG. 3, FIG. 3A shows an embodiment in which a direct current DC bias is used to select which sections of the pulse-forming network are to be charged to give a desired pulse width. Considering first the full lines of the schematic diagram, pairs of terminals 50 are shown in both FIG. 3 and FIG. 3A. SCRs 18 are reproduced in FIG. 3A again to aid in the comprehension of this figure. The upper terminal of each pair 50 is connected to an isolating resistor 51, having a resistance in the range of from 25 to 100 ohms, and therethrough to a contact of switch 52. This switch has more than one arm, as 53 and 54. These may be extended circumferentially in a solid conductive sector known as a "fan"-type switch arm, which is capable of extending over only one, two or several contacts at once, depending upon its circumferential position with respect to the arc of contacts 57, 58, etc. A voltage source, shown as battery 55, is provided with positive terminal connected to switch arms 53, 54, etc., and negative terminal connected to ground 56. This ground also connects to right leg 49 of the pulse-forming network in this embodiment.

Voltage source 55 has sufficient voltage to turn on the gate of any or all of SCRs through such isolation resistors 51 as are involved, say a voltage of 10 volts that can be maintained regardless of how many SCRs 18 are to be gated on at once. For the narrowest pulse all switch arms are disposed out of contact with all of the switch contacts and only the capacitor 12 of section N is charged and discharged. When the next longer duration is desired arm 53 is moved clockwise to contact contact 57. This results in the SCR 18 being rendered conductive and the capacitor 12 of section "d" being charged through inductor 11 each time SCR 8 is triggered into conduction. The same increase in pulse width is expanded by having arm 53 contact contact 58, while arm 54 contacts contact 57. Then SCRs 18 for both sections "d" and "c" are held in the conductive state and will pass current when this comes from SCR 8. With further switch arms or the equivalent "fan" switch arm (not shown), when rotated clockwise, gives discharge pulses of longer and longer duration.

The same effect can be obtained with only one arm, 53, if a chain of steering diodes 60 (shown dotted in FIG. 3A) is provided. These are connected between successive gate electrode connections of the pulse-forming sections, with the anode of each diode connected to the upper gate in each instance. As arm 53 is rotated clockwise, the voltage is applied to higher and higher sections of the network and the sections below are also supplied with the same potential through the conduction of successive diodes 60. Automated control can be applied to FIG. 3A, for example, a digital arrangement acting to selectively supply actuating voltage to contact 57, contact 58, etc. with diodes 60 employed. The potential supplied to the highest desired section of the pulse-forming network also causes the lower sections to be triggered as well. Alternately, potentials to more than one contact may be arranged and diodes 60 not employed.

Figure 3C:
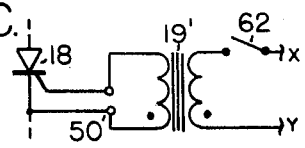
Figure 3B:
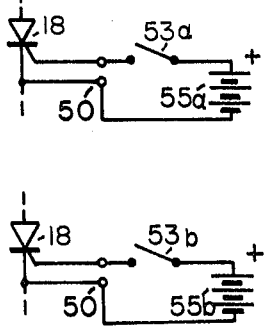

FIG. 3B shows an alternate control arrangement in which individual voltage sources 55a, b, c, d, etc. are employed. None of these are grounded, nor is ground 56 used. This arrangement is useful when ground 56 may not be employed for reasons having to do with load 32', shown in generic form in FIG. 3. The negative terminal of each of the voltage sources 55 is connected to the cathode of the SCR 18 which it controls through the lower of each of the pairs of contacts 50.

FIG. 3C shows a further alternate control arrangement employing pulse transformers 19'. The secondaries of each are connected to one pair of terminals 50 and the primaries are connected to the "x," "y" terminals of pulse generator 34, or some digital equivalent. Switches 62 represent a suitable switching arrangement for selecting the number of capacitors 12 to be charged. This embodiment is similar to that of FIG. 2, save that the several SCRs 18 and diodes 25 are in the right, rather than in the left leg of the several pulse-forming sections.

In all of the 3A, B, C embodiments the formation of the discharge power modulating pulse is accomplished through SCR 27 and the load, as has been previously described.

It has been found that the circuit parameters may be varied over wide ranges in the application of this invention. Pulse durations are usually in the order of microseconds, from a fraction of one microsecond to several microseconds for a radar load. Corresponding repetition rates may vary from 2,200 Hertz (Hz.) to 250 Hz., although such rates have been obtained as high as 10 kiloHz. and as low as 10 Hz. Capacitors 12 may have values from 0.01 microfarad (mf.) to 10 mf., depending upon the voltage involved.

Corresponding inductance values for inductor 11 are in the range of from 0.5 millihenries to 30 henries. Inductor 11 may be arranged for providing adjustable inductance by the anode of each SCR 18 being connected to a tap among a group of taps provided on the inductor. This facilitates adjustment of the circuit inductance to arrive at a desired ratio of inductance to capacitance when the number of parallel-connectable capacitors 12 is varied. Further, where weight would not be a factor, a separate inductor 11 could be provided in association with each capacitor 12, thus fixing the ratio of inductance to capacitance as may be desired. The inductance-capacitance values are related to give a half-cycle resonant charging pulse for capacitors 12 through inductor 11.

We claim:

1. An electrical variable pulse-width pulse-modulator comprising:
   a. charging means, including a supply of direct-current electrical energy;
   b. a plurality of parallel-connectable chargeable means for storing electrical energy;
   c. at least two first means connected to the charging means for applying direct-current energy to selected ones of the parallel-connectable chargeable means upon the application of an electrical control signal to said first means;
   d. a plurality of disconnect means individually interspersed between adjacent ones of the chargeable means for electrically and unidirectionally isolating one chargeable means from adjacent chargeable means;
   e. an electrical load to which an output pulse is to be applied;
   f. second means connected to the load and to the chargeable means for discharging the chargeable means into the load upon the application of an electrical switching signal to said second means;
   g. control means for providing an electrical control signal to at least one preselected said first means to thereby charge a preselected number of said chargeable means; and
   h. pulse means for triggering said second means to generate an output pulse from said modulator.

2. The electrical variable pulse-width pulse-modulator of claim 1, in which;
   a. each said first means is a triggerable electrically conductive device.

3. The electrical variable pulse-width pulse-modulator of claim 2, in which;
   a. each said first means is a silicon controlled rectifier.

4. The electrical variable pulse-width pulse-modulator of claim 1, in which;
   a. each said disconnect means is a diode.

5. The electrical variable pulse-width pulse-modulator of claim 1, in which;
   a. said second means is a triggerable electrically conductive device having a greater current-carrying capacity than that of a said first means.

6. The electrical variable pulse-width pulse-modulator of claim 1, which additionally includes:
   a. at least two transformers, each having a primary and a secondary;
   b. a connection from each primary to said control means, and
   c. a connection from each secondary to a first means to apply said electrical control signal thereto.

7. The electrical variable pulse-width pulse-modulator of claim 1, which additionally includes;
   a. an output transformer connected between said second means and said load.

8. The electrical variable pulse-width pulse-modulator of claim 1, in which;
   a. each of said plurality of chargeable means includes an inductor and a capacitor.

9. The electrical variable pulse-width pulse-modulator of claim 8, in which;
   a. the inductor and the disconnect means are connected adjacently in series with respect to said capacitor.

10. The electrical variable pulse-width pulse-modulator of claim 1, in which;
    a. only one said first means is connected to said charging means,
    b. further said first means are connected to said one first means, and
    c. further control means for providing an electrical control signal to at least one preselected further said first means at the same time that said control means provides said electrical control signal to said only one first means.

11. The electrical variable pulse-width pulse-modulator of claim 10, in which;
    a. the further said first means are connected in series with said one first means oppositely from the connection thereof to said charging means.

12. The electrical variable pulse-width pulse-modulator of claim 8, in which;
    a. one first means and one disconnect means are connected in parallel, and
    b. that parallel combination is connected in series between the inductor and capacitor for each of said plurality of chargeable means.

13. The electrical variable pulse-width pulse-modulator of claim 8, in which;
    a. one first means and one disconnect means are connected in parallel, and
    b. that parallel combination is connected to the capacitor oppositely to the connection of the inductor thereto, for each of said plurality of chargeable means.

14. The electrical variable pulse-width pulse-modulator of claim 1 in which said control means comprises;
    a. a source of voltage,
    b. multiple switching means, connected to the source of voltage, and
    c. a connection from the multiple switching means to each said first means for maintaining a conductive status thereof to allow charging of selected chargeable means upon the occurrence of a control pulse.

15. The electrical variable pulse-width pulse-modulator of claim 1, in which said control means comprises;
    a. plural sources of voltage,
    b. plural switching means, individually connected to one of said plural sources of voltage, and
    c. a connection from one switching means to one said first means for maintaining conductive status thereof to allow charging of selected chargeable means upon the occurrence of a control pulse.

16. The electrical variable pulse-width pulse-modulator of claim 1, in which said control means comprises;

a. plural pulse transformers each having a primary and a secondary,
b. plural switching means, individually connected to one of said plural pulse transformers,
c. a connection from each said secondary to one of said first means for the control thereof,
d. a source of control pulses, and
e. connections from said source of control pulses to each pulse transformer primary for supplying a pulse thereto at the same time that a control pulse is supplied to the first means which passes current to further first means.